(12) United States Patent
Alarcon Lorente

(10) Patent No.: US 11,993,029 B2
(45) Date of Patent: May 28, 2024

(54) SYSTEM AND METHOD FOR PRODUCING STRUCTURAL PROFILES BY MEANS OF CONTINUOUS FIBER BRAIDING AND STRUCTURAL PROFILE OBTAINED USING SAID SYTEM AND METHOD

(71) Applicant: ZENIT POLIMEROS Y COMPOSITES, S.L., Barcelona (ES)

(72) Inventor: Juan Alarcon Lorente, Barcelona (ES)

(73) Assignee: ZENIT POLIMEROS Y COMPOSITES, S.L., Barcelona (ES)

( * ) Notice: Subject to any disclaimer, the term of this patent is extended or adjusted under 35 U.S.C. 154(b) by 610 days.

(21) Appl. No.: 17/260,779

(22) PCT Filed: Jul. 16, 2019

(86) PCT No.: PCT/ES2019/070496
§ 371 (c)(1),
(2) Date: Jan. 15, 2021

(87) PCT Pub. No.: WO2020/016472
PCT Pub. Date: Jan. 23, 2020

(65) Prior Publication Data
US 2021/0276282 A1  Sep. 9, 2021

(30) Foreign Application Priority Data

Jul. 17, 2018 (ES) .............................. ES201830721

(51) Int. Cl.
*B29C 70/32* (2006.01)
*B29C 70/52* (2006.01)
(Continued)

(52) U.S. Cl.
CPC ............ *B29C 70/32* (2013.01); *B29C 70/521* (2013.01); *D04C 3/00* (2013.01); *B29L 2031/001* (2013.01)

(58) Field of Classification Search
None
See application file for complete search history.

(56) References Cited

U.S. PATENT DOCUMENTS

| 4,535,675 A | 8/1985 | Bull et al. |
| 5,203,249 A | 4/1993 | Adams et al. |

(Continued)

FOREIGN PATENT DOCUMENTS

| DE | 102014001961 A1 | 8/2015 |
| DE | 102014019150 A1 | 6/2016 |
| DE | 102015214909 A1 | 2/2017 |

OTHER PUBLICATIONS

International Search Report for International Patent Application No. PCT/ES2019/070496, dated Sep. 3, 2019 in 8 pages.

*Primary Examiner* — Jacob T Minskey
*Assistant Examiner* — Adrien J Bernard
(74) *Attorney, Agent, or Firm* — Knobbe, Martens, Olson & Bear, LLP

(57) ABSTRACT

The present invention relates to a system for producing structural profiles by means of continuous fibre braiding, which comprises: a machine for braiding fibres around a mandrel, the forward movement of which defines a longitudinal axis of the system; a module for injecting resin into the braided fibres; a module for curing the resin-impregnated fibres; a device for inserting and removing the mandrel; and a device for pulling the profile, wherein the braiding machine is a dual braiding machine counected to a respective fibre-reloading machine.

17 Claims, 14 Drawing Sheets

(51) Int. Cl.
*D04C 3/00* (2006.01)
*B29L 31/00* (2006.01)

(56) References Cited

U.S. PATENT DOCUMENTS

2009/0211173 A1* 8/2009 Willey .................... B29C 70/32
                                                    52/40
2018/0223797 A1* 8/2018 Caruso .................... B33Y 80/00

* cited by examiner

SYSTEM AND METHOD FOR PRODUCING STRUCTURAL PROFILES BY MEANS OF CONTINUOUS FIBER BRAIDING AND STRUCTURAL PROFILE OBTAINED USING SAID SYTEM AND METHOD

CROSS-REFERENCE TO RELATED APPLICATIONS

This application is the U.S. National Phase under 35. U.S.C. § 371 of International Application PCT/ES2019/070496, filed Jul. 16, 2019, which claims priority to Spanish Patent Application No. 201830721, filed Jul. 17, 2018. The disclosures of the above-described applications are hereby incorporated by reference in their entirety.

FIELD OF THE INVENTION

The present invention relates to a novel system and method for producing structural profiles by means of fibre braiding. In addition, the present invention also discloses a structural profile obtained by means of said novel system and method for braiding fibres.

BACKGROUND OF THE INVENTION

At present, the use is becoming ever more widespread of composite materials, i.e. materials formed by combining two or more constituent materials with significantly different chemical and/or physical properties that, once combined, produce a material with characteristics that are different from the individual components and with properties that are greater than the simple sum of the properties of components thereof, i.e. a synergic effect is produced therebetween. These compounds may be chosen to achieve unusual combinations of rigidity, strength, weight, etc.

One of the most widespread methods for producing composite materials is pultrusion. In the pultrusion process, material in the form of a fibre, for example, glass fibre, is impregnated with a resin. Said resin is usually a thermoset resin and reacts chemically when heat is applied, a process known as polymerisation and curing, which usually takes place in a mould. The internal geometry of said mould gives the part that is output the resulting shape. In the final phase of the process, pulling heads continuously draw out the profile until reaching a saw, at which point the profiles are cut to the required length.

Although it has great advantages, among which high productivity stands out, pultrusion also has significant limitations. Conventional pultrusion uses only linearly distributed or unidirectional yarns, while axial reinforcement is provided by the introduction of an amorphous veil. The result is a highly anisotropic material with an obvious weakness as regards shear or bending force resistance.

With the aim of overcoming the drawbacks of conventional pultrusion techniques, a development in pultrusion known as pullwinding has been gathering momentum in recent years. Pullwinding is the result of combining pultrusion and filament winding techniques, hence the name "pullwinding" formed by combining "pultrusion" and "filament winding".

SUMMARY OF THE INVENTION

Pullwinding introduces a single yarn machine in a pultrusion line, which allows the fibres to be oriented at a given angle. The mechanical properties of the profiles are thereby improved considerably. However, pullwinding is only capable of distributing the fibres at a given angle and not of braiding the fibres together or entwining the unidirectional yarns so that the fibres form a web. The present invention solves the above-mentioned problems by disclosing a system for producing structural profiles by means of continuous fibre braiding that allows the distribution and orientation of fibres in the material being produced to be controlled, and at the same time to form fibre strata in layers that act as a combined web. Accordingly, the present invention discloses a system for producing structural profiles by means of continuous fibre braiding, which comprises a machine for braiding fibres around a mandrel, the forward movement of which defines a longitudinal axis of the system, a module for injecting resin into the braided fibres, a module for curing said resin-impregnated fibres, a device for inserting and removing the mandrel, and a device for pulling the profile, wherein said braiding machine is a dual braiding machine associated to a respective fibre-reloading machine.

The system according to the present invention produces a fabric with in-line fibres, while said fibres are being pulled. The mechanical properties of the profile obtained are thereby considerably improved.

Another advantage of the system according to the present invention is that of allowing the reels of fibre to be reloaded without having to stop the production line. To do this, the dual braiding machine and the respective fibre-reloading machine are coordinated with the system for inserting and removing the mandrel on which the braiding is carried out.

Having to stop the production line not only results in a considerable reduction in the productive capacity of said line, that is, a significant economic loss, but also makes the use of two-component resins in said production line difficult or even impossible. In addition, line stoppages are also a problem when using closed moulds as curing modules for the resin-impregnated fibres.

Preferably, the system comprises at least two dual braiding machines, each connected to a respective fibre-reloading machine.

Preferably, each braiding machine has the ability to rotate about an axis perpendicular to the longitudinal axis of the system. This characteristic is particularly advantageous for carrying out the reloading of the reels of fibre. Advantageously, said axis of rotation also intersects the longitudinal axis of the system.

Preferably, the fibre-reloading machine comprises a plurality of fibre-holding clamps. In embodiments that comprise more than one dual braiding machine and, consequently, more than one fibre-reloading machine, each fibre-reloading machine comprises a plurality of fibre-holding clamps.

Advantageously, the fibre-reloading machine comprises a plurality of pairs of rods arranged radially. Preferably, each holding clamp comprises a pair of through-holes. Advantageously, said pair of through-holes house a respective pair of rods comprised in the fibre-reloading machine. Still more advantageously, the holding clamp is able to slide along its respective pair of rods, thus defining a fibre pick-up position and a fibre tying or knotting position. Preferably, in the fibre pick-up position, the plurality of clamps define a circle with a diameter that is equal, or approximately equal, to that of the reels of fibre arranged in the braiding machine. Preferably, in the fibre-tying position, the plurality of clamps define a circle with a diameter similar to that of the mandrel, so that when the mandrel moves forward, said mandrel holds the fibres.

Preferably, each holding clamp comprises two portions connected together. Advantageously, said two portions are connected using non-permanent connection means such as clips. Preferably, each of the portions comprises saw teeth which mesh together.

Preferably, the number of holding clamps is equal to the number of reels of fibre that the braiding machine can house.

Advantageously, the process for loading the braiding machine comprises the following steps:
a) Replacing the empty reels of fibre with new reels or reels with enough fibres to continue with the production process.
b) Placing the plurality of holding clamps of the reloading machine in the fibre pick-up position.
c) Fastening each fibre to the respective holding clamp.
d) Placing the plurality of holding clamps of the reloading machine in the tying position
e) Joining the ends of all the fibres by means of a tie or knot.

It is important to mention that the loading process described above may be carried out with the system in operation, that is, with the system producing braided structural profile.

The loading method ends, preferably, after the removal of the mandrel, at which moment the fibres are released from the respective holding clamps thereof, leaving the knot or tie approximately in the centre of the dual braiding machine. Following this, advantageously, the dual braiding machine is rotated on its own axis and is then ready to resume the production process.

Preferably, the mandrel is of a length such that one end reaches at least as far as the device for pulling the profile and the other at least as far as the device for inserting and removing the mandrel.

In an advantageous embodiment, the system also comprises a system for levelling the mandrel. Although optional, the presence of said levelling system is particularly advantageous as it allows the dimensional tolerances of the mandrel to be adjusted, more specifically, said levelling system ensures concentricity between the mandrel and the module for curing the resin-impregnated fibres. If the mandrel bends, the thickness of the structural profile would not be constant over the entire cross section thereof.

In a preferred embodiment, said system for levelling the mandrel comprises at least one electromagnetic brace. Preferably, said at least one electromagnetic brace comprises means for regulating the intensity of the electromagnetic field. In an advantageous embodiment, the intensity of the electromagnetic field generated is regulated using elongated holes which allow the plurality of electromagnetic field generators to move. Advantageously, there are four electromagnetic field generators arranged in an X shape. Preferably, the mandrel, and the fibres woven around said mandrel, are arranged at the centre of said X shape.

In one embodiment, said system for levelling the mandrel comprises at least one support device. In a preferred embodiment, said support device comprises a plurality of wheels. Advantageously, said support device has pneumatic actuators for connecting and disconnecting the plurality of wheels. Alternatively, said actuators may be actuated hydraulically and/or mechanically. Preferably, the mandrel, as well as the fibres woven around said mandrel, are arranged at the centre of the plurality of wheels. Preferably, said support device is arranged downstream of the fibre-curing module.

As well as allowing the mandrel to be supported, thus reducing possible bending problems, the use of wheels facilitates the movement of the mandrel together with the profile woven around said mandrel along the longitudinal axis of the system.

Preferably, the module for curing the resin-impregnated fibres is a mould. Advantageously, said module for curing and polymerising the resin-impregnated fibres is heated.

Advantageously, the system also comprises cutting means and a device for inspecting the profile. Preferably, the profile inspection device is an inspection device using thermography, thus allowing continuous detection of any defect in the profile. However, other inspection devices, such as ultrasound devices, for example, are also possible. The cutting means allow the profile to be cut to the required dimensions and acts in coordination with the pultrusion speed of the profile. It is important to remember that the system according to the present invention produces the braided profiles continuously, and therefore for marketing the profile or the subsequent use thereof to assemble a structure, said profile must be cut to the required length.

Preferably, the system is configured to braid glass fibres and/or carbon fibres. However, other embodiments are possible in which the fibres for being braided are made of a different material from those described above.

Numerous types of resin may be used as an impregnation resin. Preferably, said impregnation resin is an epoxy resin. However, other materials such as polyester, polyurethane, vinyl ester, etc. may also be used as an impregnation resin.

In one embodiment, the system is configured to braid fibres in two dimensions, that is, the fibres form braids with one another. In a preferred embodiment, said system is configured to braid fibres in three dimensions or triaxially, that is, with unidirectional yarn insertions between the spirals or braids produced by the fibres.

According to another aspect of the present invention, the use of a system as described above for producing structural profiles for scaffolding is also disclosed.

According to another aspect of the present invention, a structural profile obtained using a system as described above is also disclosed.

According to another aspect of the present invention, a method for producing structural profiles by means of continuous fibre braiding is also disclosed, comprising the following steps:
a) Knotting or tying the ends of a plurality of reels of fibres.
b) Causing a mandrel to move forward until said knot of fibres is caught.
c) Beginning to braid the fibres, the ends of which are caught at the end of the mandrel, around said mandrel.
d) Continuing the forward movement of the mandrel while the fibres are being braided around said mandrel.
e) Impregnating with resin the fibres braided around the mandrel.
f) Curing the resin-impregnated fibres.
g) Continuing the forward movement of the mandrel while the fibres are being braided around said mandrel until a pulling device is reached.
h) Pulling the cured fibres while maintaining the mandrel in a fixed position, which causes said braided and cured fibres to slide over the mandrel.

Preferably, said method also comprises the step of cutting the structural profile obtained following step h) described above.

Advantageously, said method also comprises the step of inspecting the braided profile looking for defects following the curing of the resin-impregnated fibres.

Preferably, said method also comprises the step of centring the mandrel. If centring of the mandrel is performed, said centring must be carried out at least once.

Preferably, said method also comprises the step of supporting the mandrel. If centring of the mandrel is performed, said supporting is carried out at least once.

Advantageously, the fibres of the dual braiding machines are reloaded while the method for producing structural profiles described above is being carried out.

According to another aspect of the present invention, a structural profile obtained by means of the method described above is also disclosed.

Advantageously, when the reels of fibre run out, the braiding process is stopped, the mandrel is completely removed, the dual braiding machine which was previously loaded is turned round and the production process starts again. If there is more than one dual braiding machine, the process of loading and rotating the dual braiding machine is carried out for each of said machines.

According to another aspect of the present invention, a structural profile obtained by means of the method described above is also disclosed.

In this document, the directions horizontal, vertical, up, down, etc. should be understood in relation to the normal running position of the system according to the present invention, that is, with the mandrel parallel to the floor.

BRIEF DESCRIPTION OF THE DRAWINGS

For a better understanding, the accompanying drawings are given as an explanatory but non-limiting example and show an embodiment of the system for producing structural profiles by means of continuous fibre braiding according to the present invention.

DETAILED DESCRIPTION OF THE PREFERRED EMBODIMENTS

Figure 1:
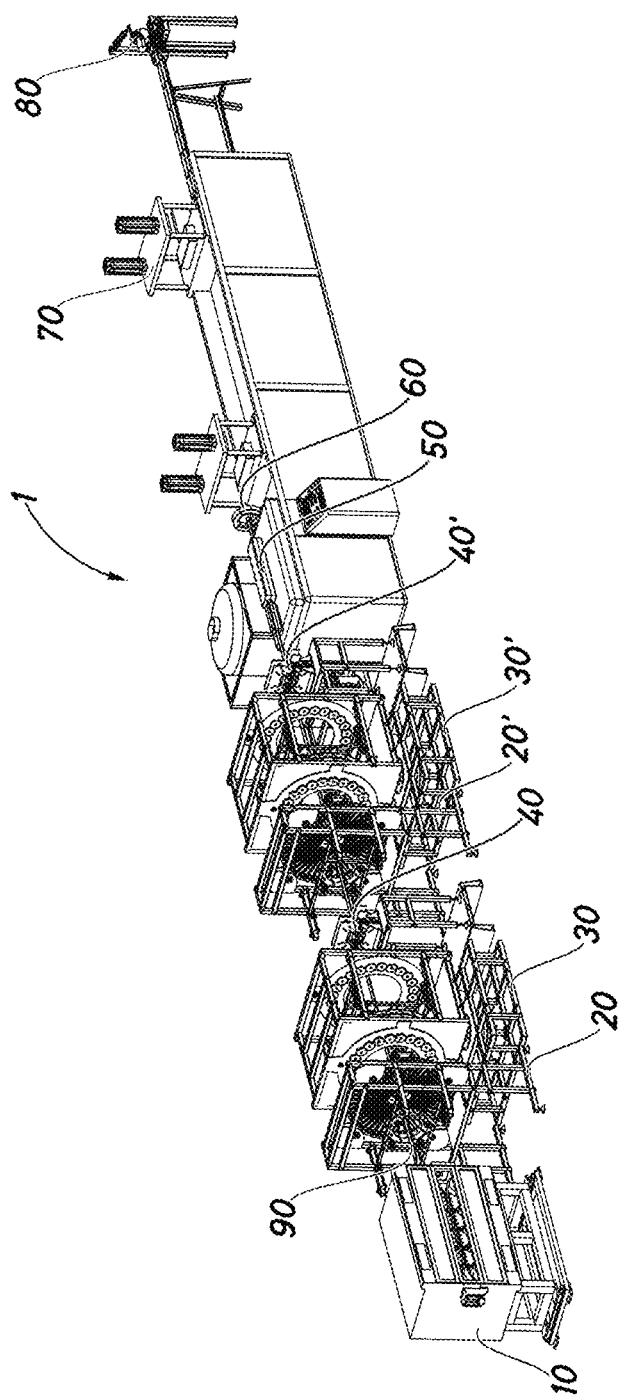
FIG. 1 is a perspective view of an exemplary embodiment of a system for producing structural profiles by means of continuous fibre braiding according to the present invention.

In the figures, elements that are the same or equivalent are identified with identical reference numerals.

FIG. 1 is a perspective view of an exemplary embodiment of a system for producing structural profiles by means of continuous fibre braiding according to the present invention. In the embodiment shown in said figure, the system -1- has a pair of dual braiding machines -30-, -30'-, each associated to its respective fibre-reloading machine -20-, -20'-. The system of the exemplary embodiment shown has a system -40-, -40'- for levelling the mandrel -90-.

As can be seen, the system of the exemplary embodiment shown is headed by the device -10- for inserting and removing the mandrel, the operation of which will be detailed below.

Located downstream of the pair of reloading machines -20-, -20'- and braiding machines -30-, -30'- are the module for injecting resin into the braided fibres and the module for curing said resin-impregnated fibres, which in the exemplary embodiment shown both take place in the injection mould -50-. The resin which is injected by the injection mould -50- may be mixed with catalysts and/or additives. Located downstream of the injection mould is the inspection device -60- which, in the exemplary embodiment shown, continuously inspects the quality of the product produced. Although it is preferable to carry out the inspection continuously, other embodiments in which said quality control is carried out in batches, randomly, etc. are also possible. In the exemplary embodiment shown, the inspection device -60- is an inspection unit that uses thermographic cameras, however it should be noted that other types of inspection devices, such as ultrasound devices, for example, are also possible. It is important to mention that although highly recommended, the inspection device -60- is an optional element of the system -1- for producing structural profiles by means of continuous fibre braiding object of the present invention.

In the exemplary embodiment shown in FIG. 1, situated downstream of the inspection device -60- is the profile pulling device -70-, the main function of which is to keep the profile that is being woven or produced under traction. The pulling device -70- ensures that, once the mandrel -90- is in the operating position thereof, the profile that is being woven thereon continues sliding on said mandrel. In the exemplary embodiment shown, the pulling device -70- is able to operate continuously at a speed of between 0.3 and 0.5 metres per minute. Other embodiments of the system object of the present invention may have pulling devices that operate at a speed other than that mentioned above.

To finish the production process, the exemplary embodiment shown comprises cutting means in the final step thereof which in this case are in the form of a saw -80-. Said saw -80- is preferably an automatic cutting saw which cuts the profile to the required dimensions. The operation of the saw -80- varies according to the speed of production and forward movement of the profile.

As can be seen, the various elements forming the system are, in this exemplary embodiment, distributed linearly.

This figure shows that the mandrel -90- is of a great length, approximately 8 metres in the exemplary embodiment shown.

Figure 2:
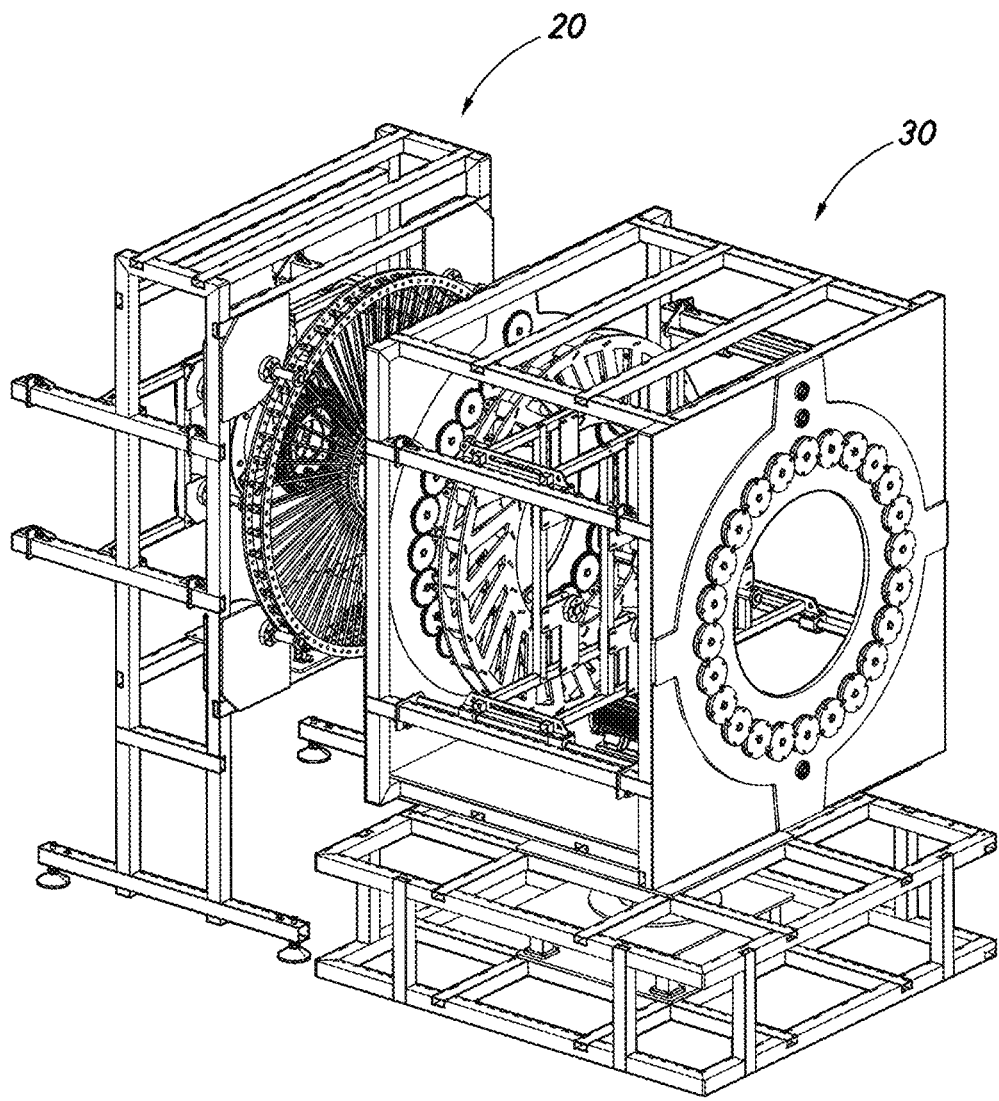
FIG. 2 is a perspective view of a dual braiding machine and its respective fibre-reloading machine thereof of an exemplary embodiment of a system for producing structural profiles according to the present invention.

FIG. 2 shows in perspective a dual braiding machine and its respective fibre-reloading machine of an exemplary embodiment of a system for producing structural profiles according to the present invention.

Figure 3:
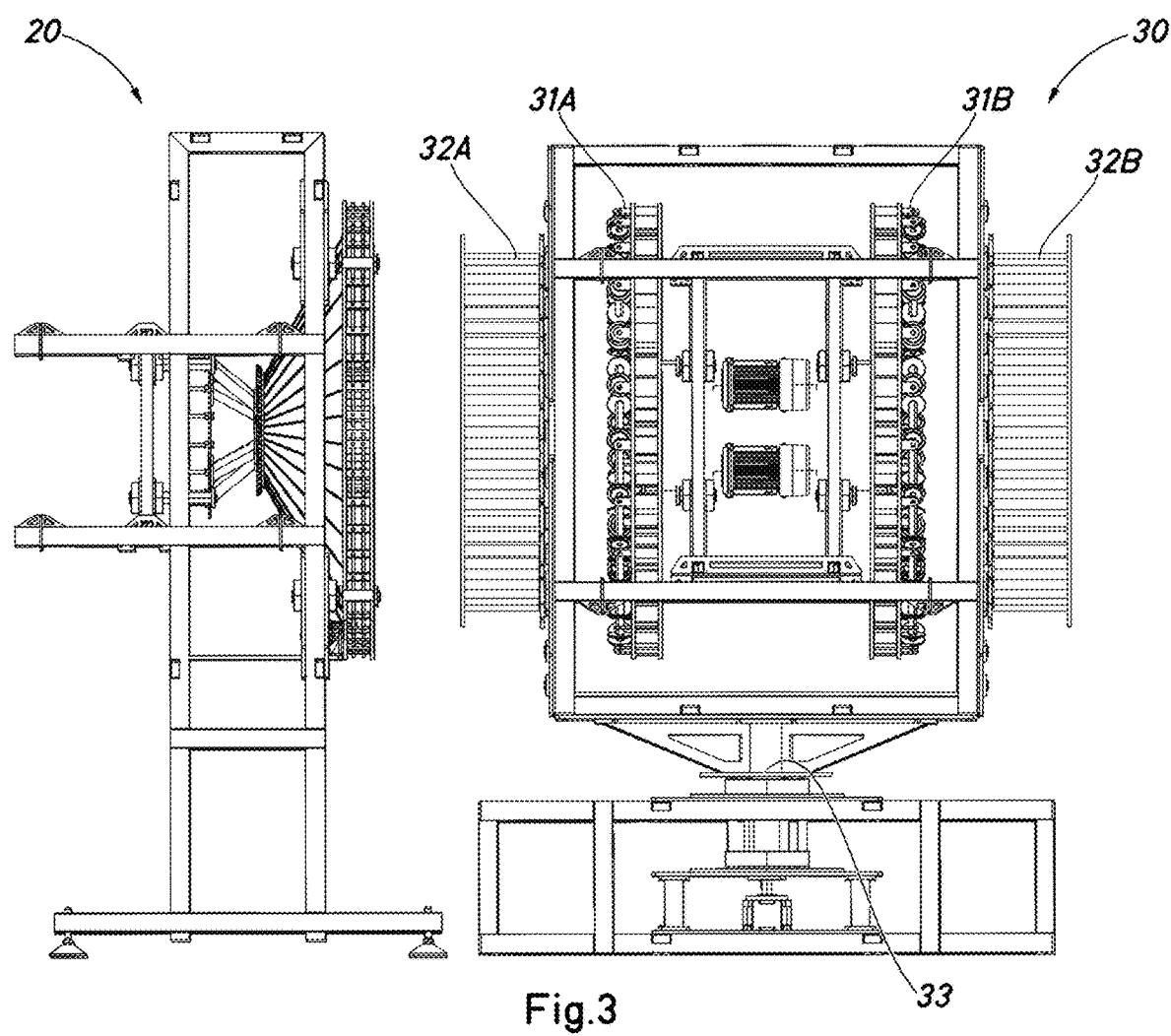
FIG. 3 is a front elevation view of the dual braiding machine and its respective fibre-reloading machine of FIG. 2.

FIG. 3 shows the dual braiding machine and its corresponding fibre-reloading machine of FIG. 2 in front elevation. Unlike FIG. 2, where the braiding machine -30- does not have the reels of fibre mounted, in FIG. 3, the reels of fibre that will form the structural profile have been shown. As can be seen, the elements of the dual braiding machine -30- are duplicated, which allows an operator to replace the spent reels of fibre while the fibres are being woven to form the corresponding structural profile. The reels of fibre -31A-, -31- are arranged on a circular structure and supply unidirectional yarns which, after passing between the braids or spirals formed by the reels -32A-, -32B-, form the three-dimensional fabric. Although weaving in three dimensions is recommended because the profile that is obtained has better mechanical properties, the dual braiding machine -30- may also weave in two dimensions or conventionally. To do this, all that is required is that the reels -31A-, -31B- are not loaded.

The portion of the braiding machine -30- facing the reloading machine -20- is the portion that is idle and waiting to be loaded, or loaded and waiting for the fibres of the other portion, which is weaving, to run out.

Figure 4:
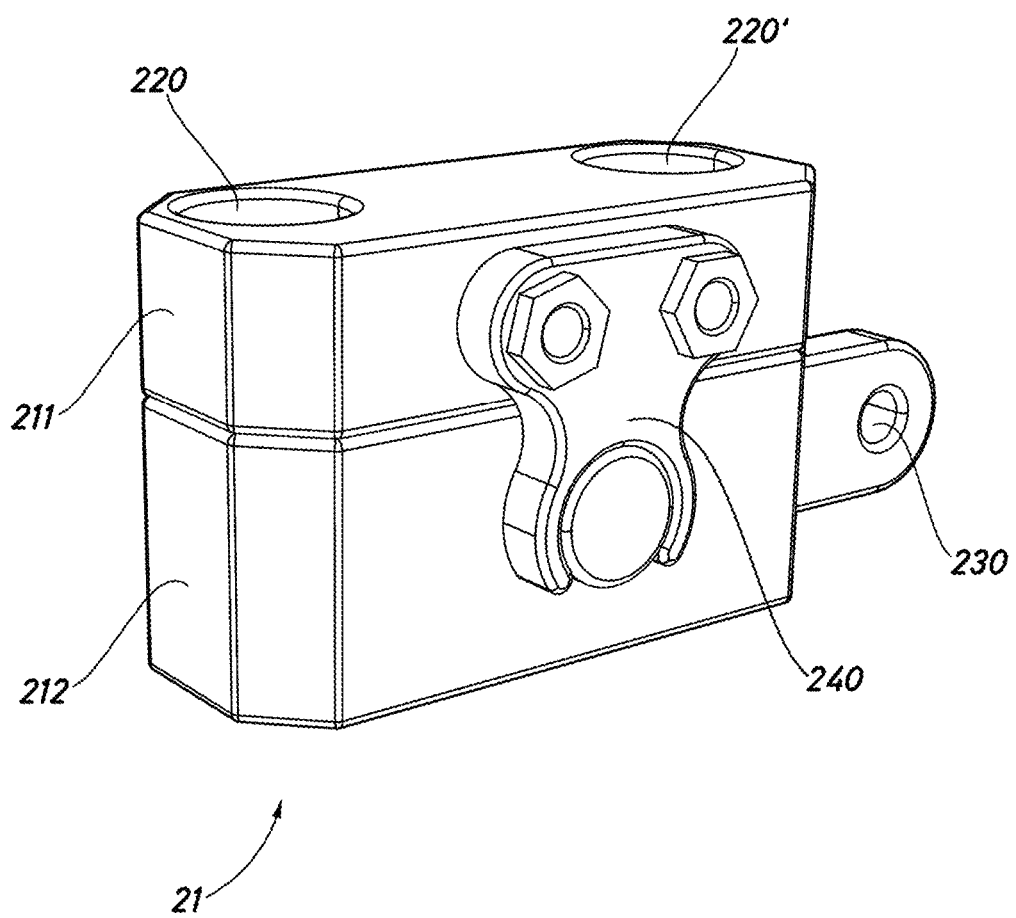
FIG. 4 is a perspective view of a clamp for holding fibres of a fibre-reloading machine of an exemplary embodiment of a system for producing structural profiles according to the present invention.

FIG. 4 shows in perspective a fibre-holding clamp of a fibre-reloading machine of an exemplary embodiment of a system for producing structural profiles according to the present invention. In the exemplary embodiment shown, the holding clamp -21- is made up of two portions -211-, -212- both connected together by non-permanent connection means, in this case, a clip -240-. In addition, both portions -211-, -212- comprise saw teeth which mesh together, although this cannot be seen in this figure because the saw teeth are inside the portions -211-, -212-.

Both portions -211-, -212- comprise a pair of through-holes -220-, -220'- each intended to house a pair of rods -23- of the reloading machine (see, among others, FIGS. 7 and 9), such that the clamp -21- is able to slide along said pair of rods -23- so as to move from the fibre pick-up position to the fibre tying or knotting position. The portion -212- comprises a projection which in turn comprises an aperture -230-. Said aperture -230- is connected to the "umbrella", that is, to the mechanism that makes it possible to move from the fibre pick-up position to the fibre tying or knotting position, the operation of which is similar to the opening and closing mechanism of an umbrella.

Figure 5:
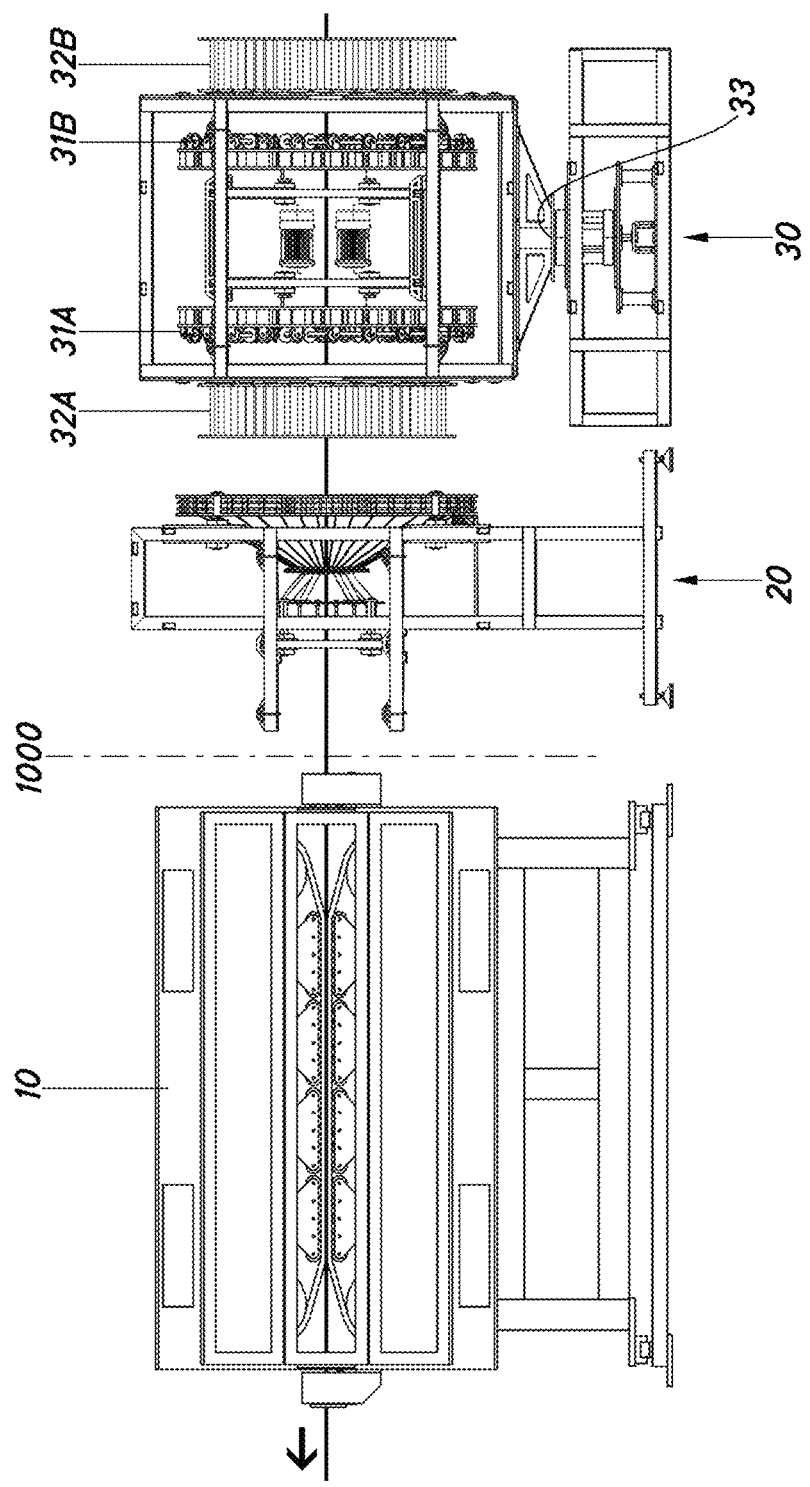
FIG. 5 is a front elevation view of a device for inserting and removing the mandrel, a fibre-reloading machine and a braiding machine of an exemplary embodiment of a system for producing structural profiles according to the present invention.

FIG. 5 is a view in front elevation of a device for inserting and removing the mandrel, a fibre-reloading machine and a braiding machine of an exemplary embodiment of a system for producing structural profiles according to the present invention. This figure shows the removal of the mandrel -90-, which in the exemplary embodiment shown is necessary in order to be able to reload the fibres once said fibres have run out.

While the braiding machine -30- is weaving in the direction in which the fibres are being pultruded, the operator can leave the idle portion loaded. To do this, the operator takes the beginnings of the fibre yarns from the reels of the idle portion and places said yarns in the clamps -21- of the reloading system (see FIG. 5). Once closed, said clamps -21- prevent the fibres from sliding. The braiding machine -30- continues to run normally until the fibres run out, at which moment the injection of resin into the mould -50- (see FIGS. 1 and 2) is stopped and the manoeuvre to remove the mandrel -90- takes place. The element responsible for carrying out said removal manoeuvre is the device -10- for inserting and removing the mandrel. Said device -10- also performs the function of bracing the mandrel -90- while the system is running, that is, while the system is producing the structural profile by weaving the fibres.

In the exemplary embodiment shown, in order to allow the rotation of the dual braiding machine -30- and the running of the reloading machine -20-, the device -10- for inserting and removing the mandrel moves the mandrel -90- in the opposite direction to the profile pultrusion direction until the position -1000- is reached, at which moment the reloading machine -20- carries out the fibre-positioning manoeuvre. In this case, the fibre-positioning manoeuvre, prior to said fibres being pushed by the mandrel -90-, consists of grouping the fibres into a point with a smaller diameter than the initial diameter and joining said fibres together by means of a tie or knot. Said fibre-positioning manoeuvre is illustrated in FIGS. 7 to 12.

Although in the exemplary embodiment shown the position -1000- is right at the start of the reloading machine -20-, in other embodiments this position may be moved, but bearing in mind that the mandrel -90- has to be withdrawn until a point is reached which makes the rotation of the dual braiding machine -30- feasible.

Figure 6:
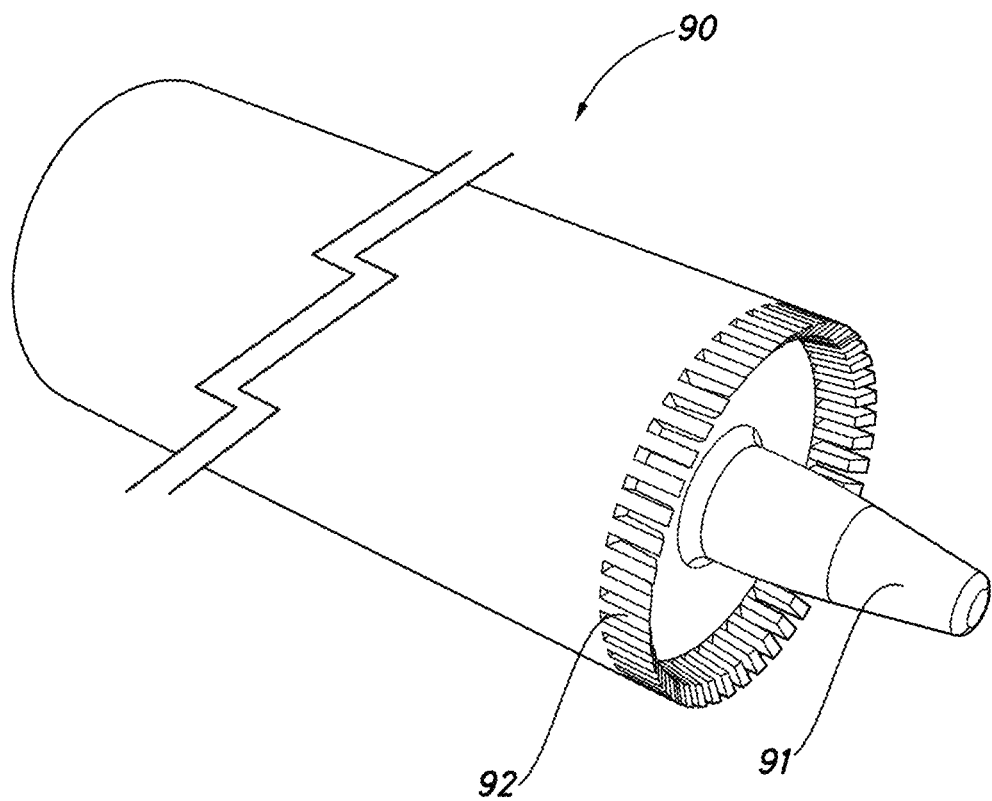
FIG. 6 is a perspective view of a mandrel of an exemplary embodiment of a system for producing structural profiles according to the present invention.

FIG. 6 shows in perspective an exemplary embodiment of a mandrel according to the present invention. It should be noted that for illustrative reasons in this figure a break has been shown in the mandrel -90-. As can be seen, in the exemplary embodiment shown, the mandrel -90- has a substantially truncated cone-shaped projection -91- at one end. Said projection -91- is accompanied by a plurality of projections -92- distributed uniformly over the perimeter of the mandrel. Preferably, and as shown in the image, said plurality of projections -92- extends in the longitudinal direction of the mandrel -90-. As can be seen, the projections -92- are not contiguous, that is, there is an empty space between them. This geometry allows the fibres to be caught and pulled by the forward momentum of the mandrel -90-.

FIGS. 7 to 12 illustrate the process of reloading a dual braiding machine and its respective reloading machine thereof according to the present invention.

Figure 7:
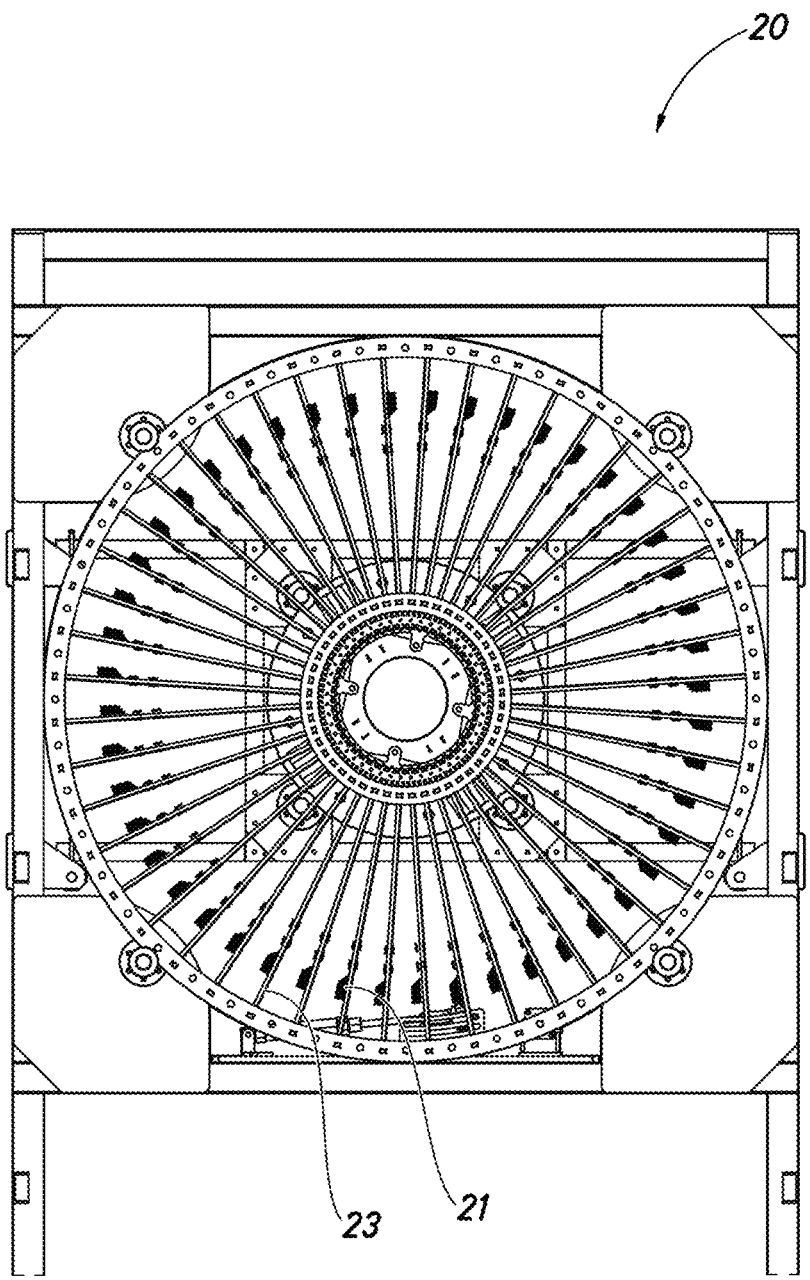
FIG. 7 is a profile view of a fibre-reloading machine, with the clamps in an extended position, of an exemplary embodiment of a system for producing structural profiles according to the present invention.
Figure 8:
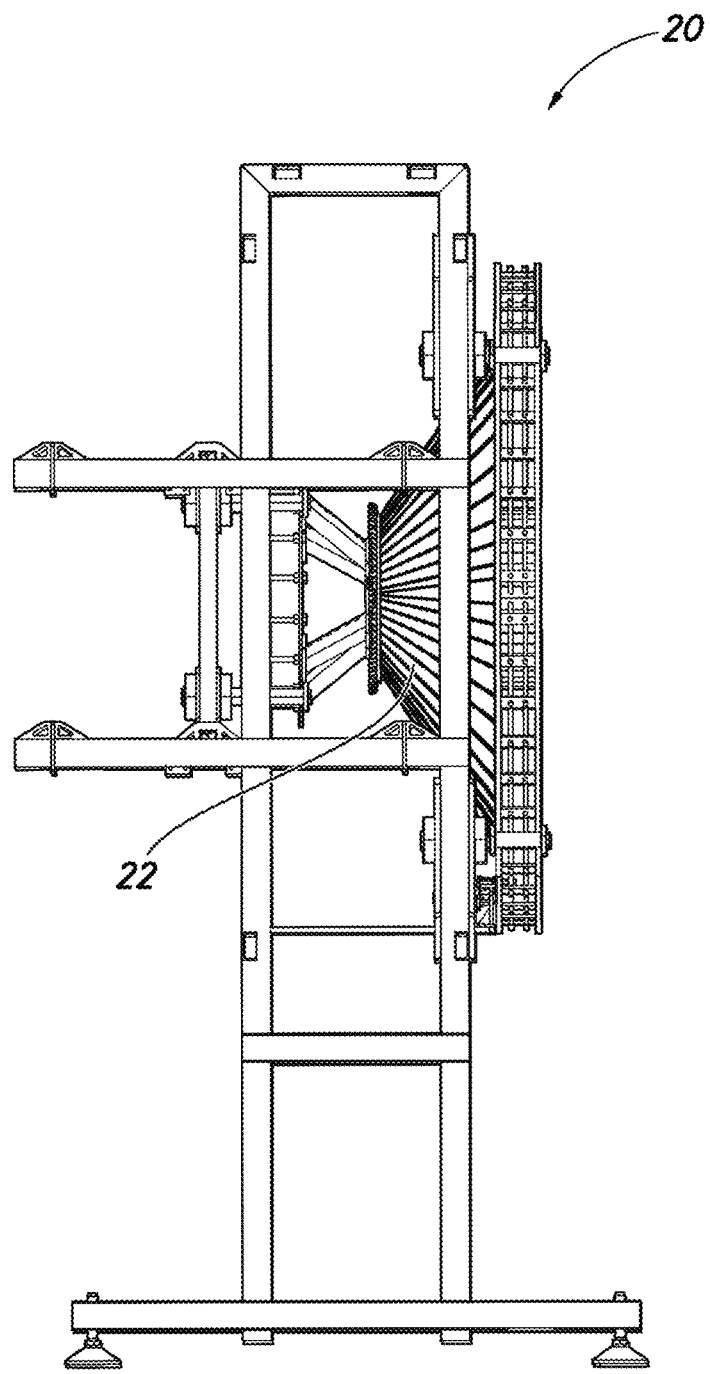
FIG. 8 is a front elevation view of the fibre-reloading machine of FIG. 7.

FIGS. 7 and 8 show in profile and front elevation, respectively, a reloading machine -20- in the fibre pick-up position. In this position the plurality of holding clamps -21- are distributed to form substantially a circle of the same or approximately the same diameter as that formed by the reels of fibre of the dual braiding machine -30-. In the exemplary embodiment shown, said diameter is approximately 1 metre. FIG. 7 also shows very clearly the plurality of pairs of rods -23-, along which the respective plurality of holding clamps -21- slide. The reloading machine -20- comprises in the central portion an aperture for the mandrel -90- to pass through (for reasons of clarity in FIGS. 7 to 12 the mandrel -90- has not been shown). FIG. 8 shows clearly the plurality of rods -22- which form the "umbrella" mechanism responsible for causing the plurality of holding clamps -21- to slide along their respective pair of rods -23-. Accordingly, each clamp -21- is articulately joined to its respective rod -22- through the aperture -230- (see FIG. 4).

When the plurality of holding clamps -21- are in the fibre pick-up position, the operator attaches the end of the reel of fibre to its respective holding clamp -21-. This operation is repeated one by one for each reel of fibre comprised in the braiding machine -30-. Preferably, the number of holding clamps is equal to the number of reels of fibre comprised in the braiding machine. This operation may be carried out by the operator with the system running, that is, with the system producing structural profile by means of fibre braiding and pultrusion.

Figure 9:
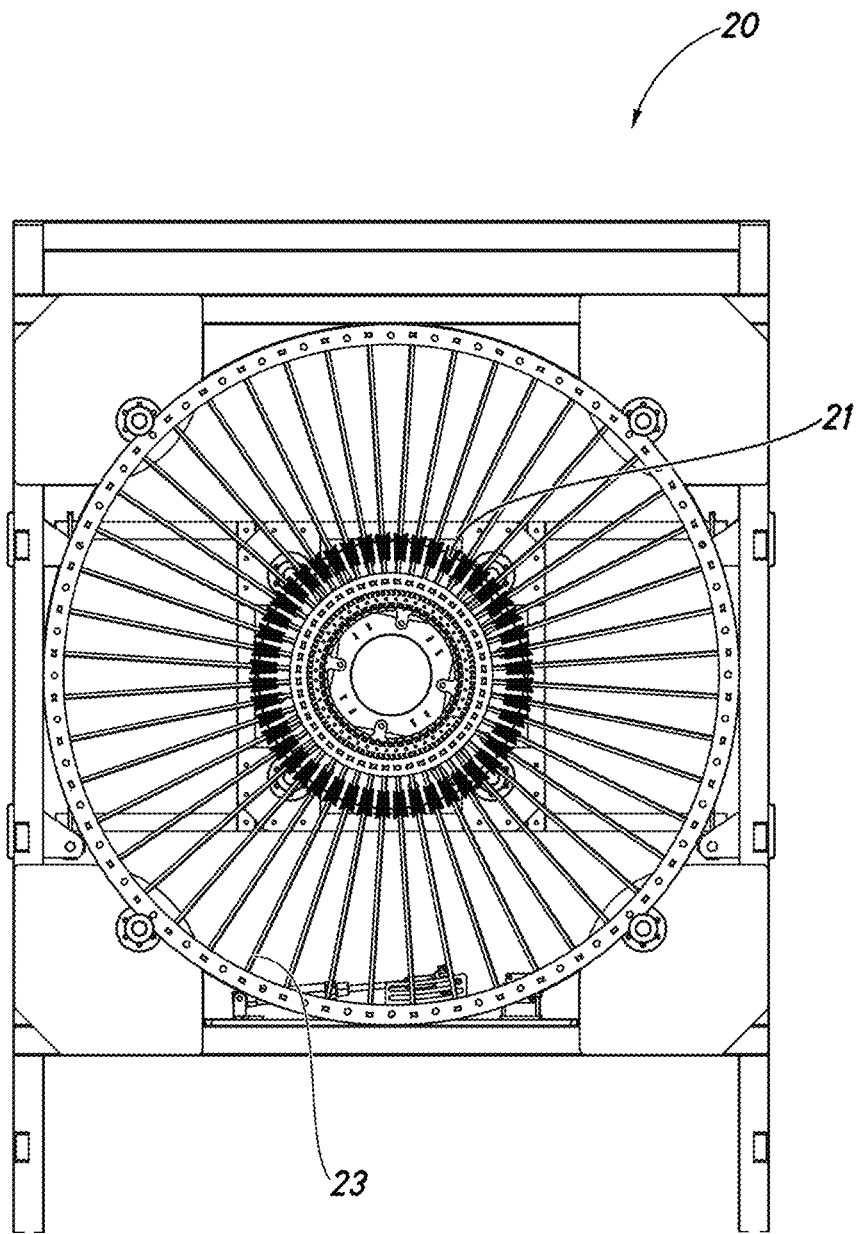
FIG. 9 is a profile view of a fibre-reloading machine, with the clamps in a retracted position, of an exemplary embodiment of a system for producing structural profiles according to the present invention.
Figure 10:
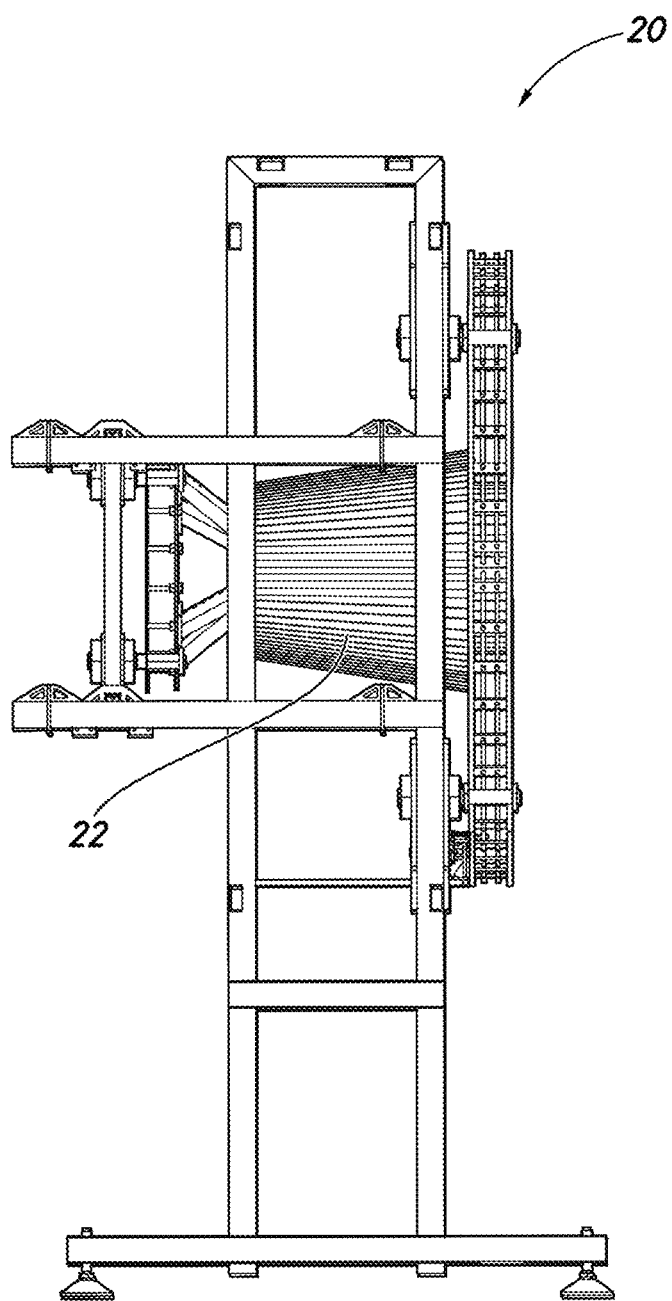
FIG. 10 is a front elevation view of the fibre-reloading machine of FIG. 9.

FIGS. 9 and 10 show in profile and front elevation, respectively, a reloading machine -20- in the fibre tying or knotting position. To move from the fibre pick-up position shown in FIGS. 7 and 8 to the tying position in FIGS. 9 and 10 the plurality of rods -22- pulls the plurality of holding clamps -21- causing said holding clamps to slide along its respective pair of rods -23- until said holding clamps are arranged to form a circle of smaller diameter, which in the exemplary embodiment shown is approximately 20 centimetres. The plurality of rods -22- may be actuated to move from the pick-up position to the tying position or vice versa manually by the operator or automatically.

Once the plurality of holding clamps -21- together with the fibres held by said clamps are in the tying position, the operator joins all the fibres by means of a tie or similar and leaves said fibres in this position waiting until, after removing the mandrel -90-, the operation of reloading the dual braiding machine -30- connected to said reloading machine -20- can end.

Figure 11:
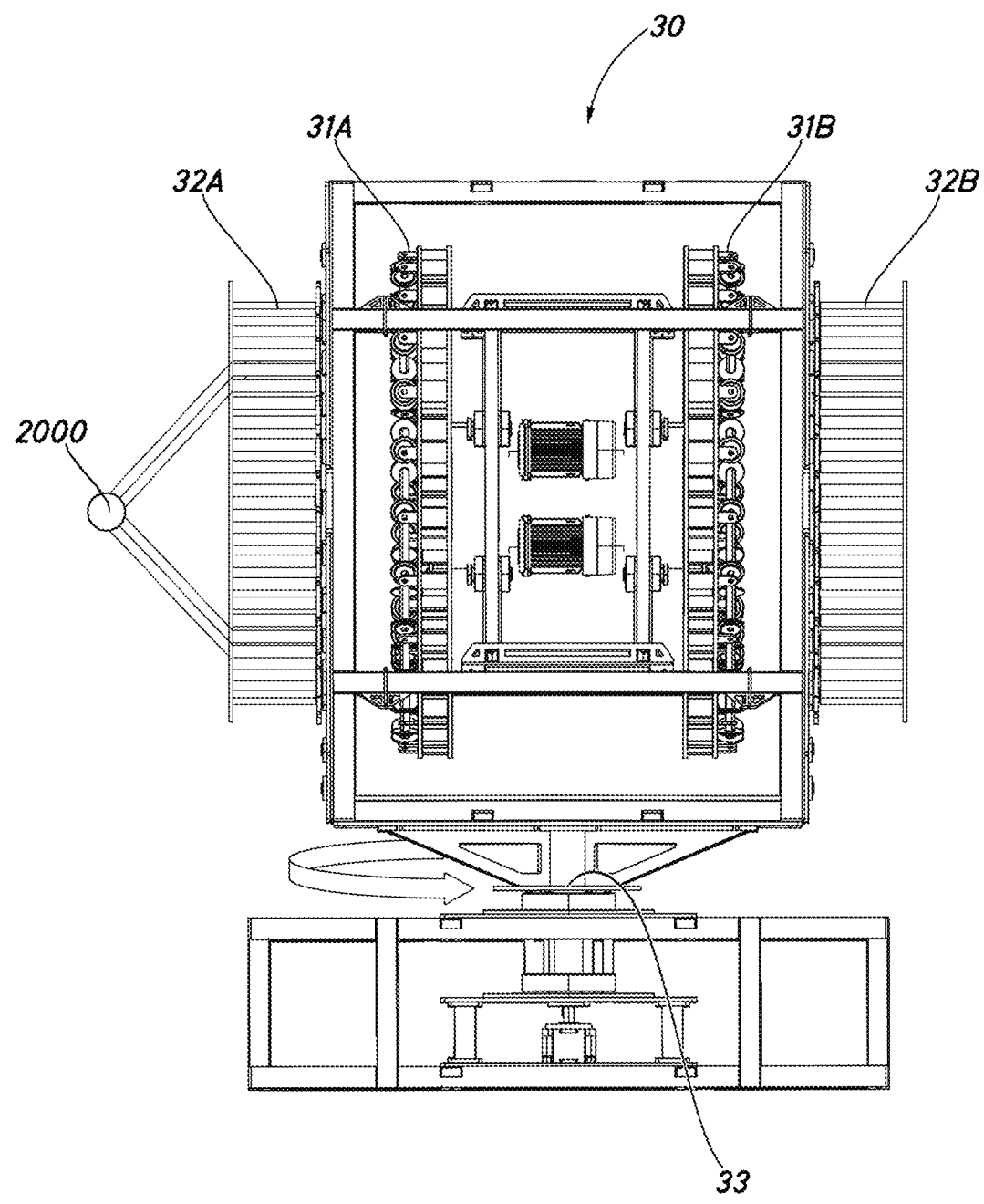
FIG. 11 is a front elevation view of a dual braiding machine of an exemplary embodiment of a system for producing structural profiles according to the present invention during the fibre reloading process.

FIG. 11 shows the moment when, after removal of the mandrel -90-, the operator lets go of the knot -2000- of fibres and rotates the dual braiding machine -30- about its axis -33-. Said axis -33- is perpendicular to the longitudinal axis of the system, defined by the direction of forward movement of the mandrel -90-. In addition, the axis -33- and the longitudinal axis of the system intersect. The rotation of the braiding machine -30- may be actuated by a motor, as in the exemplary embodiment shown, or manually by the operator.

Figure 12:
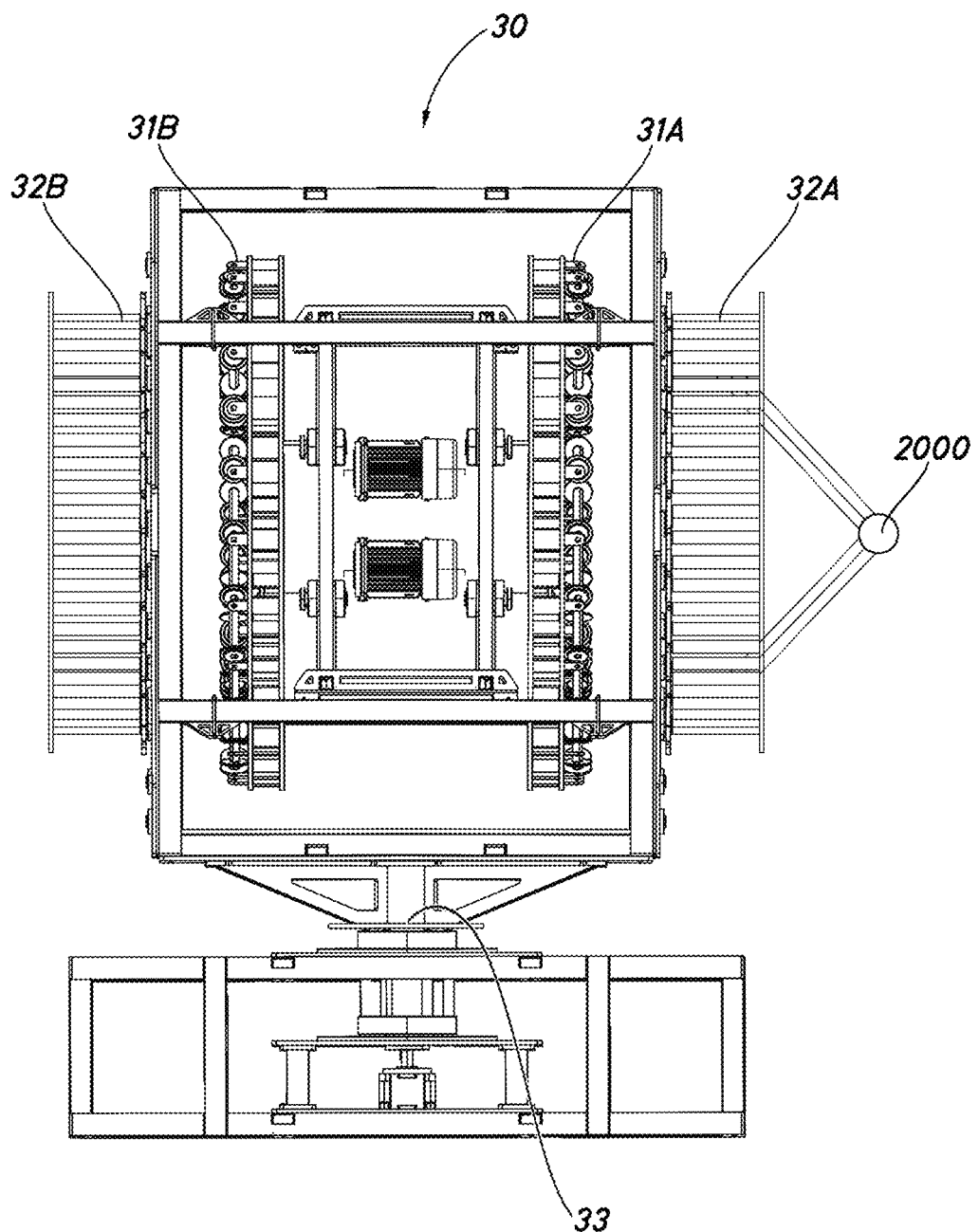
FIG. 12 is a front elevation view of a dual braiding machine of an exemplary embodiment of a system for producing structural profiles according to the present invention after reloading the fibres.

As shown in FIG. 12, after rotating the dual braiding machine -30-, the reels that have run out or are about to run out -31B-, -32B- move to the reloading position, that is, facing the reloading machine -20- (note that for illustrative reasons the reloading machine -20- has not been shown in FIG. 12). Furthermore, the new or loaded reels -31A-, -31B-, together with the knot -2000- move to take up the braiding position. In this position, when the production process resumes, the mandrel -90- moves forward until said knot -2000- is caught by the projection -91- and the plurality of projections -92-. Once the knot -2000- has been caught in the mandrel -90- the dual braiding machine -30- begins to weave the fibres around said mandrel -90-.

The reloading process described above is carried out in a similar way on the braiding machine -30'- and the reloading machine -20'- (see FIG. 1). In embodiments in which the system comprises multiple dual braiding machines, the process is similar for each machine.

Figure 13:
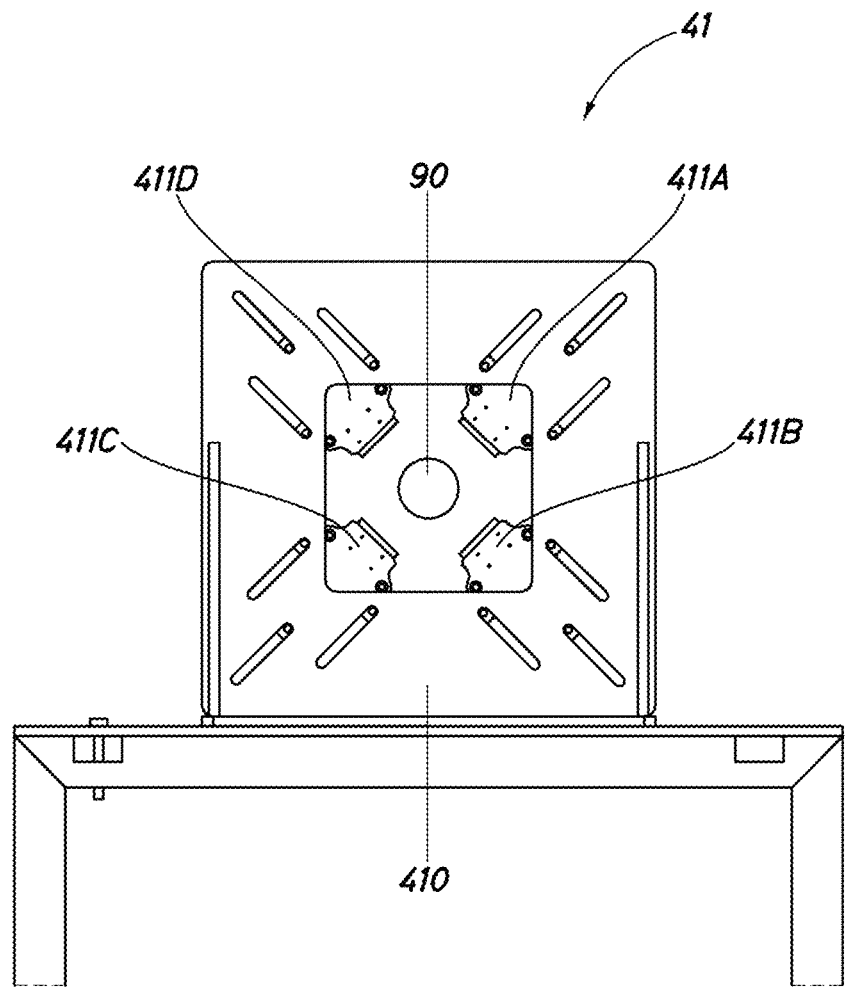
FIG. 13 is a profile view of an electromagnetic brace of an exemplary embodiment of a system for producing structural profiles according to the present invention.

FIG. 13 shows in profile an electromagnetic brace for an exemplary embodiment of a system for producing structural profiles according to the present invention. The electromagnetic brace -41- shown in this figure forms part of the system -40- for levelling the mandrel -90- shown in FIG. 1. As can be seen, in this embodiment the electromagnetic brace -41- comprises four induced electromagnetic field generators -411A-, -411B-, -411C-, -411D- arranged in an X shape and attached to a structure or body -410-. The attachment between the induced electromagnetic field generators and the structure -410- is such as to allow the movement of said generators -411A-, -411B-, -411C-, -411D-. In the exemplary embodiment shown, this is achieved by means of a plurality of elongated holes which allow a linear movement of the generators -411A-, -411B-, -411C-, -411D-. In the exemplary embodiment shown, by moving the generators, the intensity of the magnetic field generated is regulated, which magnetic field is in turn responsible for supporting the mandrel -90- by generating an opposite force to the weight thereof. As can be seen, the mandrel -90- is positioned at the centre of the electromagnetic field generators -411A-, -411B-, -411C-, -411D-.

Figure 14:
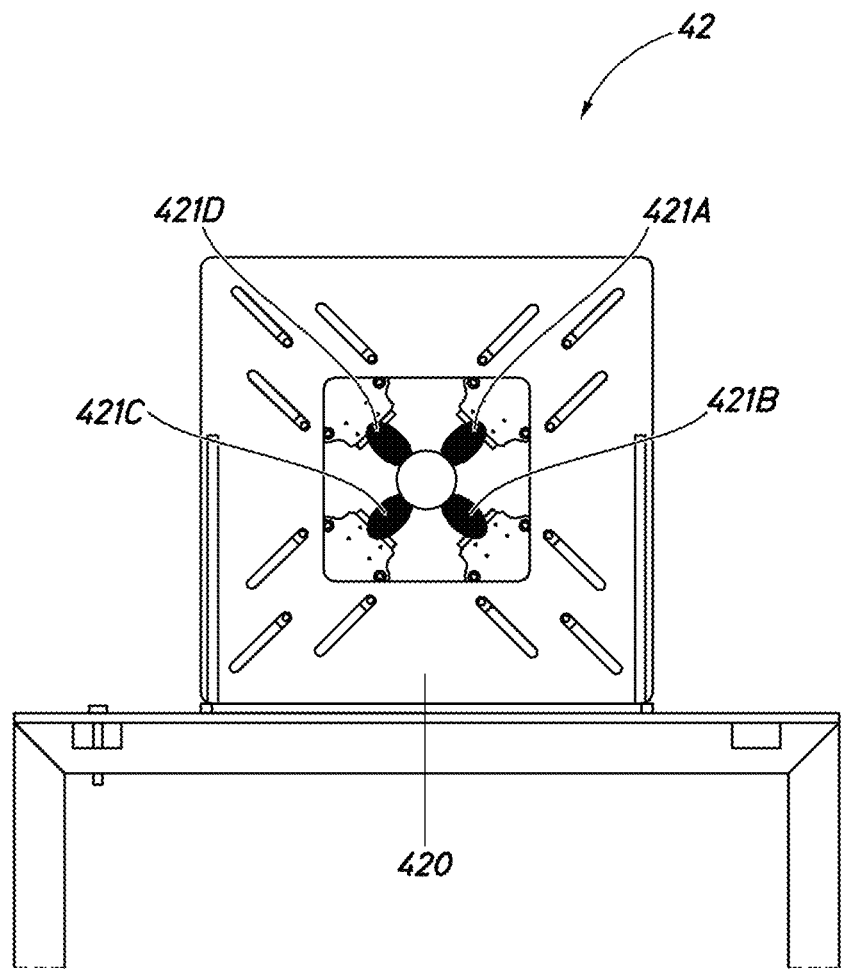
FIG. 14 is a profile view of a support device of an exemplary embodiment of a system for producing structural profiles according to the present invention.

FIG. 14 shows in profile a support device of an exemplary embodiment of a system for producing structural profiles according to the present invention. In the exemplary embodiment shown, the support device -42- comprises four wheels -421A-, -421B-, -421C-, -421D-, each arranged in a different corner of a square comprised in the body or structure -420-, that is, the wheels -421A-, -421B-, -421C-, -421D- are arranged in an X shape. In this exemplary embodiment, the wheels -421A-, -421B-, -421C-, -421D- can be connected and disconnected by means of pneumatic actuators. However, embodiments are also possible in which said actuators are hydraulic and/or mechanical. The use of wheels means that as well as supporting the mandrel -90-, the longitudinal movement of the mandrel -90- and of the profile woven around said mandrel is also facilitated.

The support device -42- is arranged preferably downstream of the mould -50-. However, it is also possible to position said device -42- upstream of the mould -50-.

The electromagnetic brace -41- shown in FIG. 13 and the support device -42- of FIG. 14 form part of the system -40- for levelling the mandrel -90-, the main purpose of which is to ensure that the mandrel -90- and the mould -50- are concentric (see FIG. 1), thus ensuring that the profile produced has a uniform thickness throughout the entire cross section thereof.

Although preferably in the present invention concentricity between the mandrel -90- and the mould -50- is ensured by bracing the mandrel -90- in the insertion and removal device -10- at one end and the support device -42- at the other end of said mandrel, together with at least one intermediate electromagnetic brace -41-, other embodiments are also possible that have a different combination of elements, the purpose of which is to ensure concentricity between the mandrel and the modules for injecting resin and for curing the fibres impregnated therewith.

Next, the operation of an exemplary embodiment of a system for producing structural profiles by means of continuous fibre braiding according to the present invention will be summarised below, based on the figures described above. The process begins with the loading of the dual braiding machines -30-, -30'-. To do this, each of said dual braiding machines has a respective reloading machine -20-, -20'-.

Once the process of reloading the dual braiding machines -30-, -30'- has been carried out, the mandrel -90- begins to move forward driven by the device -10- for inserting and removing said mandrel -90-. On moving forward, the mandrel -90- catches the tips of the fibres, which were previously tied, at which moment the dual braiding machines -30-, -30'- begin to weave the profile around the mandrel -90-. Said mandrel -90- and the profile woven around said mandrel continue moving forward until reaching an injection mould -50- in which the fibres are impregnated with resin. The resin-impregnated fibres are also cured in said mould -50-.

After passing through the injection mould -50-, the mandrel continues moving forward passing through an inspection device -60- which, in the exemplary embodiment shown, inspects the structural profile using thermography in search of possible defects.

The mandrel -90- continues to move forward until reaching a pulling device -70-, at which moment said mandrel -90- stops moving forward. However, the pulling device -70- pulls the profile woven around said mandrel -90- causing said profile to slide and continue moving forward through the system -1- for producing structural profiles. Finally, the structural profile produced is cut to the required lengths by the saw -80-.

Once the reels of fibre of the dual braiding machines -30- have run out, the mandrel is removed, the previously loaded braiding machines -30- are rotated and the process resumes.

Although the invention has been presented and described with reference to embodiments thereof, it will be understood that these do not limit the invention, and therefore many structural or other details that may be clear to persons skilled in the art after interpreting the subject matter disclosed in the present description, claims and drawings may vary. In particular, in principle and unless explicitly stated otherwise, all the characteristics of each of the different embodiments and alternatives shown and/or suggested may be combined with each other. Thus, all the variants and equivalents will be included within the scope of the present invention if said variants and equivalents may be considered as falling within the widest scope of the following claims.

What is claimed is:

1. A system for producing structural profiles by means of continuous fibre braiding, comprising:
    a machine for braiding fibres around a mandrel, the forward movement of which defines a longitudinal axis of the system,
    a module for injecting resin into the braided fibres,
    a module for curing the resin-impregnated fibres,
    a device for inserting and removing the mandrel, and
    a device for pulling the profile,
    wherein said braiding machine is a dual braiding machine associated to a fibre-reloading machine,
    wherein elements of the dual braiding machine are duplicated, and
    wherein the dual braiding machine is configured to rotate about an axis perpendicular to the longitudinal axis of the system.

2. The system according to claim 1 comprising at least two of the dual braiding machines, each connected to respective fibre-reloading machines.

3. The system according to claim 1 further comprising a system for levelling the mandrel.

4. The system according to claim 3, wherein said system for levelling the mandrel comprises at least one electromagnetic brace.

5. The system according to claim 4, wherein said at least one electromagnetic brace comprises means for regulating the intensity of the electromagnetic field.

6. The system according to claim 3, wherein said system for levelling the mandrel comprises at least one support device.

7. The system according to claim 6, wherein said support device comprises a plurality of wheels.

8. The system according to claim 1 further comprising cutting means and a profile inspection device.

9. The system according to claim 1, wherein the system is configured to braid fibres in three dimensions.

10. The system according to claim 1, wherein the system is configured to braid glass fibres and/or carbon fibres.

11. The system according to claim 1, wherein said mandrel comprises at the ends thereof a plurality of perimetral grooves for positioning and attaching the fibres.

12. The system according to claim 1, wherein the fibre-reloading machine comprises a plurality of fibre-holding clamps.

13. The system according to claim 12, wherein the fibre-reloading machine comprises a plurality of pairs of rods arranged radially and each holding clamp is able to slide along the respective pair of rods so as to define a fibre pick-up position and a fibre tying position.

14. A method for producing structural profiles by means of continuous fibre braiding with a system according to claim 1, which comprises the following steps:
    a) Knotting or tying the ends of a first plurality of reels of fibres,
    b) Causing a mandrel to move forward until said knot of fibres is caught,
    c) with a dual braiding machine, beginning to braid the fibres, the ends of which are caught at the end of the mandrel, around said mandrel,
    d) Continuing the forward movement of the mandrel while the fibres are being braided around said mandrel,
    e) Impregnating with resin the fibres braided around the mandrel,
    f) Curing the resin-impregnated fibres,
    g) Continuing the forward movement of the mandrel while the fibres are being braided around said mandrel until a pulling device is reached,
    h) Pulling the cured fibres while maintaining the mandrel in a fixed position, which causes said braided and cured fibres to slide over the mandrel,
    wherein after the first plurality of reels of fibre has run out, the dual braiding machine previously loaded with a second plurality of reels of fibre is turned round and the process is repeated from step a) using the second plurality of reels of fibre.

15. A structural profile obtained by the method according to claim 14.

16. A scaffolding comprising the structural profile according to claim 15.

17. A system for producing structural profiles by means of continuous fibre braiding, comprising:
    a machine for braiding fibres around a mandrel, the forward movement of which defines a longitudinal axis of the system,
    a module for injecting resin into the braided fibres,
    a module for curing the resin-impregnated fibres,
    a device for inserting and removing the mandrel, and
    a device for pulling the profile,
    wherein said braiding machine is a dual braiding machine associated to a fibre-reloading machine,
    wherein the fibre-reloading machine comprises a plurality of fibre-holding clamps, and
    wherein the fibre-reloading machine comprises a plurality of pairs of rods arranged radially and in that each holding clamp is able to slide along the respective pair of rods, thus defining a fibre pick-up position and a fibre tying position.

* * * * *